United States Patent
Korpela et al.

(10) Patent No.: US 10,961,136 B2
(45) Date of Patent: Mar. 30, 2021

(54) COMBIFLOTATION FOR PURIFICATION AND DISINFECTION OF WASTE WATER

(71) Applicant: OY ELFLOT LTD, Turku (FI)

(72) Inventors: Timo Korpela, Turku (FI); Alexander Lashkul, Turku (FI); Choong-Kyang Kang, Paju (KR)

(73) Assignee: OY ELFLOT LTD, Turku (FI)

( * ) Notice: Subject to any disclaimer, the term of this patent is extended or adjusted under 35 U.S.C. 154(b) by 60 days.

(21) Appl. No.: 16/257,356

(22) Filed: Jan. 25, 2019

(65) Prior Publication Data
US 2019/0322549 A1 Oct. 24, 2019

(30) Foreign Application Priority Data
Apr. 22, 2018 (FI) ..................... 20187058

(51) Int. Cl.
*C02F 1/465* (2006.01)
*C02F 1/461* (2006.01)

(52) U.S. Cl.
CPC .......... *C02F 1/465* (2013.01); *C02F 1/46109* (2013.01); *C02F 2201/002* (2013.01); *C02F 2201/46135* (2013.01); *C02F 2209/03* (2013.01); *C02F 2209/38* (2013.01); *C02F 2303/04* (2013.01)

(58) Field of Classification Search
CPC ....................................................... C02F 1/46
See application file for complete search history.

(56) References Cited

U.S. PATENT DOCUMENTS

| | | | | |
|---|---|---|---|---|
| 4,728,410 A | * | 3/1988 | Renzler | B01D 17/0205 204/229.6 |
| 5,275,732 A | * | 1/1994 | Wang | B01D 53/72 210/188 |
| 2005/0230321 A1 | * | 10/2005 | Berrak | C02F 1/463 210/748.01 |
| 2010/0116652 A1 | * | 5/2010 | Wiemers | C02F 1/463 204/297.01 |
| 2012/0205257 A1 | * | 8/2012 | Collier | C12M 33/00 205/757 |
| 2015/0001094 A1 | * | 1/2015 | Ibeid | C02F 1/4672 205/744 |
| 2018/0354818 A1 | | 12/2018 | Korpela et al. | |

OTHER PUBLICATIONS

J. Park, et al. "Simultaneous removal of cadmium and turbidity in contaminated soil-washing water by DAF and electroflotation", Water Science and Technology, 46(11-12), pp. 225-230, Dec. 2002.*
K.I. Khimiya, "Electroflotation and Flotation using Air Dissolved in Water" in Coke and Chemistry USSR, English Translation, Allerton Press, Inc: New York, New York, pp. 112-114 (Year: 1988).*
Cassell, E. et al., The effects of bubble size on microflotation, Water Research, Dec. 1975, pp. 1017-1024, vol. 9, issue 12, Elsevier.
Clewer Markkinointi Oy, Combining traditional flotation with electroflotation, schematic drawing, dated Feb. 14, 2014, 1 page.

* cited by examiner

*Primary Examiner* — J. Christopher Ball
(74) *Attorney, Agent, or Firm* — Berggren LLP

(57) ABSTRACT

A method and device is provided for combining various forms of flotation techniques to achieve a very high degree of purification of waste water while energy consumption is maintained low.

11 Claims, 4 Drawing Sheets

COMBIFLOTATION FOR PURIFICATION AND DISINFECTION OF WASTE WATER

PRIORITY

This application claims priority of Finnish national application number 20187058 filed on Apr. 22, 2018, the contents of which is incorporated herein by reference.

FIELD OF INVENTION

The present invention deals with purification of waste water from suspended and colloidal particles with techniques, which primarily lifts the particles up to or causes flotation of the particles on the surface of a waste water tank instead of allowing them to sediment onto the bottom. More specifically, the present invention establishes novel and non-obvious traits as to how to combine different forms of known flotation techniques in an optimal way so that the purification degree will be very high while the energy consumption can be maintained low. Depending on the requirements, the equipment can be optionally constructed in such a way that viable microbial counts in the purified water will be small.

BACKGROUND OF THE INVENTION

Humankind is encountered with increasing problems of municipal and industrial waste waters, which must be purified and reused. Physical, chemical, and biological purification processes have been developed for these purposes. The impurities to be removed during the purification are usually particles, which are kept in aqueous phase by their colloidal nature. After a biological purification, waste waters usually contain still unfermented materials and high content of viable microbes as well as microbial cell debris. The complex microbe-colloid system can be broken by suitable chemicals, like polyvalent metal ions or polymers, which allow colloids to combine and form bigger particles or flocks. The colloidal particles remain suspended in water with extremely complex molecular mechanisms and there is no single universal method to break such ionic and hydrophobic forces in the system. Even small amounts of dissolved molecules can affect the flock formation. Alive microbes have metabolically acquired means to create electrical charges around them and thus to avoid sedimentation. It follows that destroying of the metabolisms will facilitate aggregation of the microbes. On the other hand, providing nutrients and oxygen to microbes will prevent the aggregation. If flocks can be developed, they can easily sediment in gravitational systems or be subjected to a centrifugation process. A less common manner would be to lift the flocks onto the surface of the waste water tank by exploiting the buoyance force of air or other gas bubbles with flotation techniques.

The traditional or air flotation exploits compressed air, which is pumped through nozzles into waste water as described in FIG. 1. Whilst air flotation is the simplest flotation process, it has several drawbacks. Only a part of treated water is saturated by gas and the incidence of meeting of particle and the lifting air bubbles is low. The bubble sizes are in all cases big (diameter>200 µm) and their internal pressure is therefore small (0.2-0.5 bars). This leads to a big increase of the bubble volume during the movement up in waste water with an accelerating speed. Because the bubble volume is big, it moves very fast in the solution. These facts cause that bubbles' surface will lose the particles, which may have already attached to them. That is why the air flotation machines always contain also means to remove suspended solids from the bottom of the flotation chamber.

Micro flotation (also termed as dissolved air flotation, DAF) is an advanced technique, which allows creation of smaller bubble sizes than in the traditional flotation (diameter>100 µm). Micro flotation has been shown to be an efficient process for the removal of various colloid-sized impurities from water and waste water. Laboratory studies have shown that for this purpose very small bubbles are required. The investigation showed a rapid decrease in micro flotation removal efficiencies when bubble diameters exceed 55-60 µm (*Water Research*, 9, 1975, pp 1017-1024 by E. Cassel et al.). In micro flotation water is saturated with pressurized air. Each gas in air gas mixture dissolves in water according to its mole fraction in the mixture. The amount of dissolved gas is dependent on its partial pressure and temperature. Such air-saturated water is mixed with incoming waste water as shown in FIG. 2. When pressure is released, very small (visibly seen as milky) air-bubbles are generated, which attach effectively to suspended particles and lift them up onto the surface of the flotation tank. This technique has the advantage that gas bubbles tend to be generated around particles and the bubbles do not need to find the particles like in the traditional flotation, i.e. particles act as bubble generation centers. Moreover, since tiny gas bubbles are generated in huge amounts (effective surface area is big) also the probability factor determining that suspended particles and small bubbles meet each other is high and therefore the purification results are definitely better than in any traditional flotation systems. Because the waste water and air-saturated water can be mixed instantaneously, gas bubbles do not need to be spread (diffuse) in the solution like in traditional flotation. The pressurized water can be, for example, circulated from the outlet of the purification system. A drawback is that a limited amount of air can be dissolved in water and hence a limited amount of bubbles can be created in a given volume. Micro flotation also suffers from the absence of a covering bubble mat over the whole waste water pathway and a part of the particles is sedimented.

Electroflotation has been mainly deployed for industrial waste water purification (especially fatty impurities) and is not so familiar in communal purification systems. FIG. 3 shows a typical electroflotation machine. Gas bubbles are generated by electrical current through water electrolysis. The bubbles are small (diameter 10-70 µm) and they are either positively or negatively charged. It is possible to regulate bubble size by changing the electric current density, pH, geometry of electrodes, added chemicals, etc. Electrolytically generated bubbles are very homogenous in size and practically they do not coalesce after leaving the electrode surface and keep their constant diameter during moving up in the liquid. Because of the very small volume (and high surface tension/volume), the internal pressure of the bubbles can be up to $10^3$ bars. The generated oxygen and hydrogen (in statu nascendii) in the bubbles can cause significant changes in the properties of the suspended solids through the chemical reactions. Proteins may react with oxygen and hydrogen (reduce or oxidize) and also living microbes may lose their colloidal properties. Thus, the electrolysis advance flock formation or flocculation. An advantage of electroflotation is that water can be saturated by gas as much as it is required for the process by increasing the current to electrodes. Electroflotation may be performed at any temperature of water, what is impossible for other types of flotation.

However, a serious drawback in adoption of electric technologies in waste water purification is the technical realization of convenient and long-life maintenance-free equipment. The primary reason for that origins from electrode corrosion and electrode passivation by deposition of materials on the electrodes. When considering the overall economy, usual low corrosion anode materials, like titanium and stainless steel may be optimal. The corroded electrodes should be easily serviced, i.e. changed and cleaned.

SUMMARY OF THE INVENTION

The present invention, referred hereinafter as combiflotation, overcomes several drawbacks of the above-described techniques of air flotations and electroflotation. Principle of combiflotation is described in FIG. 4. The advantages gained by the present invention include faster and better purification than with any one method alone. The particle lifting (buoyance) force of the bubbles is possible to maintain over the whole process which yields good purification results with negligible sedimentation. Combining the air and electroflotation allows very flexible operation since a combiflotation device has several independently adjustable controls. Electrode life-time can be significantly increased.

The closest analogue to the present invention may be described in a scheme published by Clewer Ltd. in a brochure from Feb. 14, 2014. It is possible to contemplate, based on the scheme and text included, that traditional flotation and electroflotation are combined. A metal net functions as an electrode, which produces bubbles and pressurized air is coming below it through a nozzle. However, it is also possible to imagine from the scheme that an electrically charged net will disrupt big air bubbles and charge them electrically raising through the net. However, a person skilled in the art could not be able to construct any functioning purification machine based on the drawing, which evidently was made for only commercial goals and not to reveal technical details.

It is claimed that the system by Clewer eliminates pathogens. The introduction of air usually accelerates the microbial growth and not remove or eliminate microbes since in waste water oxygen usually causes a metabolic burst in the growth. If the system includes electrolysis gases which are generally considered the reason for microbial disinfection or elimination, the dilution of the toxic electrolysis gases by air can cause only negative results for obtaining the desired objective. One possibility is that the claim by Clewer Ltd. of eliminating/removing pathogens is based on so-called dissolving electrodes, which produces toxic antimicrobial metal salts.

The referred scheme of Clewer does not show the direction of the waste water flow and does not indicate any relative dimensions of the equipment. There is described a zone of bubbles mixing with each other. Such situation could only arise if the liquid flow in the tube in the center of the scheme is from up to down because only in such conditions there could be generated steady state conditions, which could enable creation a zone enriched with the bubbles, i.e. when the vertical velocity of liquid flow is down and the velocity of bubbles created by the buoyance forces are balanced. In such a case it would be possible to create a relatively high concentration of the toxic gases and the claimed elimination of the microbes by disinfection could be understandable. The fast-moving air bubbles could be used as a fast airlift and the flocks are allowed to sediment (no froth scraper is included) when coming up from the small tube in the center. The assumption that the outlet tube is located in the center introducing the sterilized liquid out and the inlet on the upper right side of the tank is also supported by two conical walls in the big tank, which indicate to a sedimentation system. Froth removal system is not indicated. If the only purpose was to disinfect the outgoing liquid from sedimentation tank, it is also reasonable that the energy consumption is low as claimed in the scheme. Assuming round construction for the scheme by Clewer, it is possible to deduce that only disinfection and sedimentation functions are included in the construction. Therefore, the scheme cannot describe the principle of combiflotation of this discloser, which has essential feature of removing suspended solids by combinatory effects of air bubbles and electrolysis gases.

The invention described and claimed here is aimed to solve the problems of the known art. The aim of the present invention is to improve the waste water purification processes while decreasing or maintaining the energy consumption. A further aim is to provide more flexibility to purification of waste waters which alternate with light and heavy solid loads. Generally, the goal is to separate water phase from the water-immiscible phase and collect these phases for any further use.

DETAILED DESCRIPTION OF THE INVENTION

Figure 1:
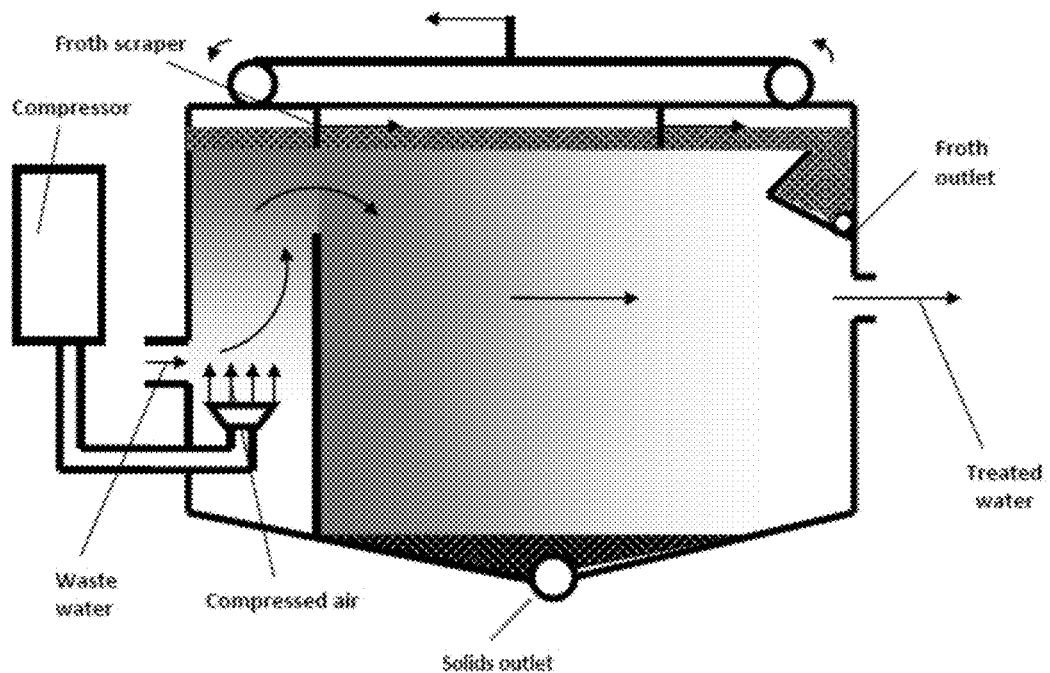
FIG. 1 describes the principle of traditional air flotation. The airlift for suspended particles does not cover the whole area of clarification tank and therefore sedimentation occurs.
Figure 2:
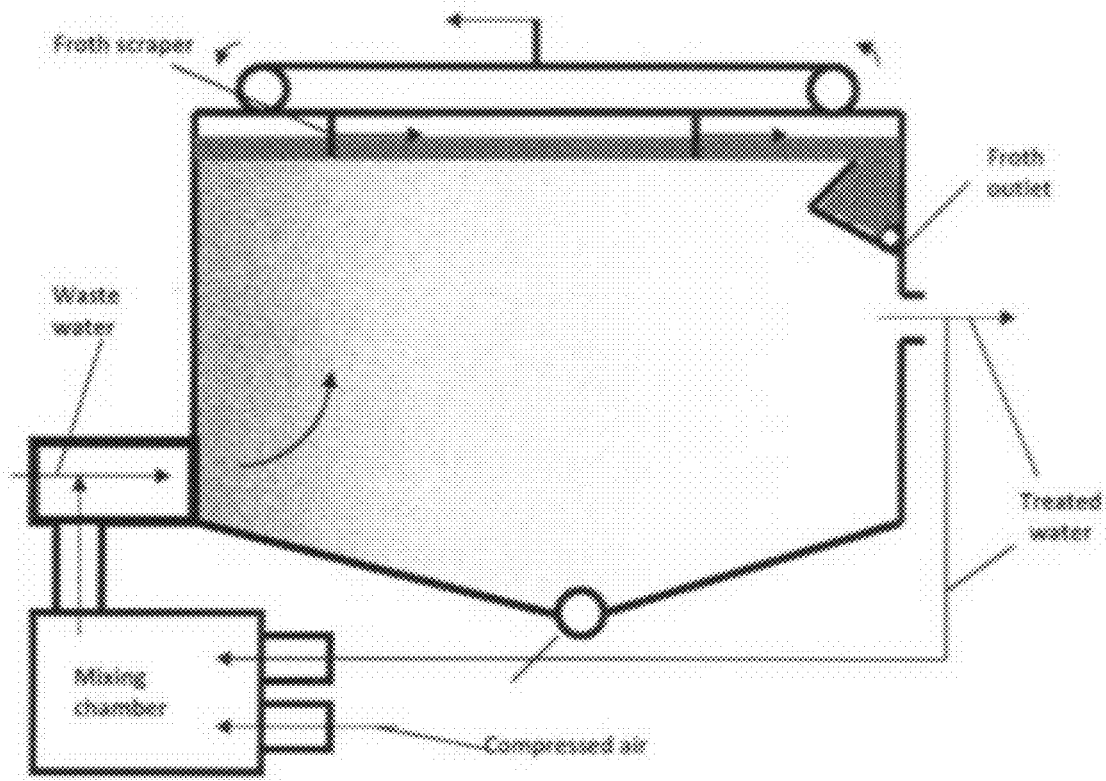
FIG. 2 illustrates the micro flotation principle. Part of the treated water is circulated back and saturated with compressed air, which forms micro bubbles when released to normal pressure. Microscopic particles serve as bubble-generation centers. Partial sedimentation occurs since the airlift of the suspended particles is weakening during the pathway out.
Figure 3:
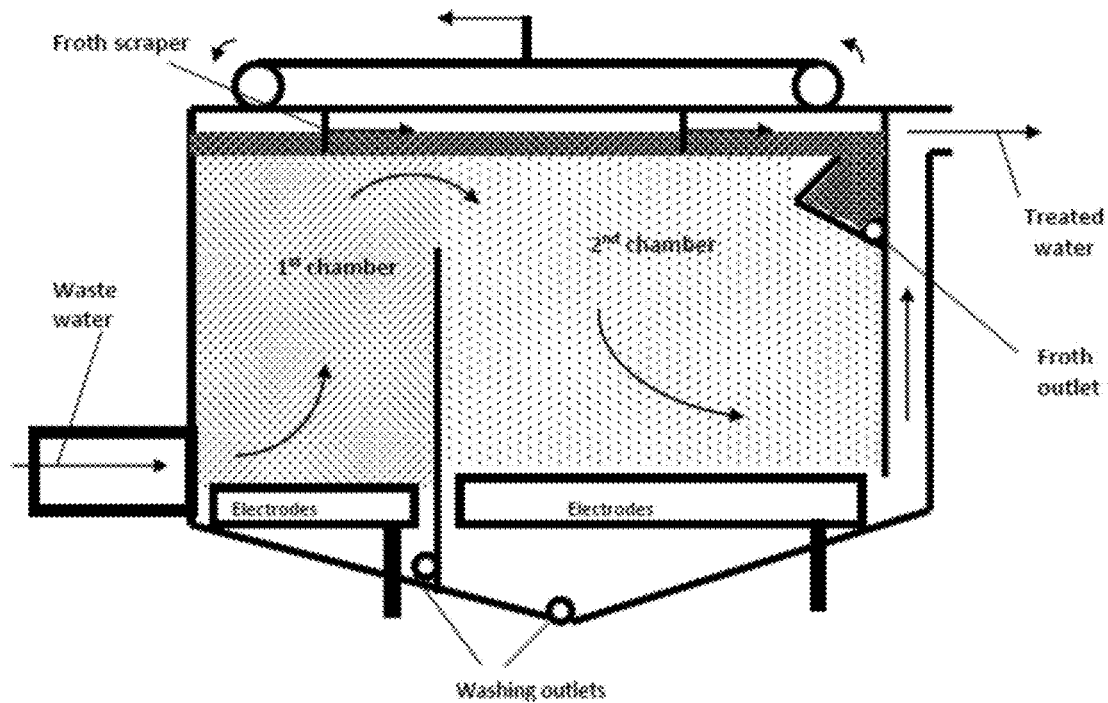
FIG. 3 illustrates an advanced model of 2 stage electroflotation equipment.

The aim of the present invention is to improve the waste water purification processes while decreasing or maintaining the energy consumption. A further aim is to provide more flexibility to purification of waste waters which alternate with light and heavy solid loads. Several variants were tested, and it was surprisingly found that by combining air flotation, especially micro flotation, and electroflotation, it is possible to gain several qualitatively and quantitatively novel technical benefits. Experimental results show significantly better and quicker purification by combiflotation especially for high-load waste waters than in the prior art. By using air-lift assisted electroflotation, it is possible to use low current densities in the electrolysis, that is a crucial improvement to the electroflotation techniques in the prior art.

Definitions

Waste water is used herein broadly for water which shall be purified further for improving the water quality in regard of organic and non-organic contaminants. The term waste water is used including but not limited to, surface water, groundwater, industrial process water, sanitary sewage, industrial waste water, water containing chemicals, conventional water treatment, activated sludge treatment, and waters from domestic and communal plants. It is assumed that the waste water is free from big fast sedimenting particles and has a viscosity which allows the application of flotation techniques. Thus, waste water means a liquid containing pure water with soluble materials (e.g. salts, fully water-soluble small-molecular compounds etc.) and solid (inorganic or organics, microbes, . . . ), semisolid (solid fats) or/or water immiscible oils. Such waste water may look like one phase or a slurry which can be homogenous for limited time.

Flotation means herein removal of solids or colloids from contaminated water by using pressurized air or electrolysis gas bubbles to lift flocks formed in the liquid to the water surface. The flocks can be formed spontaneously in the system or formed by addition of flocculating chemicals.

Air flotation means flotation acquired by pressurized air either through micro flotation or the traditional flotation effected by pressurized air into liquid through a nozzle.

Disinfection means killing of small living organisms (e.g. bacteria, fungi, germ, pollen, viruses, prions) in waste water. These organisms are usually harmful pathogens. Removal and elimination of pathogens means their removal or disinfection. The number of said living organisms are measured and expressed as viable counts.

An electrode is herein an electrically conductive material (metal, semiconductor, graphite, conductive polymer) immersed into the waste water containing electrolytes originating from the source of the waste water or which are intentionally added to achieve an electric current between plus (anode) and minus (cathode) electrodes. The construction of the electrodes is made to resist the required current densities and so that the anode and cathode locate at a suitable distance to allow proper resistivity of the solvent.

Covering electrode mat means an electrode on the bottom of an electroflotation machine which produces a uniform flow of bubbles over the whole flotation chamber.

Figure 4:
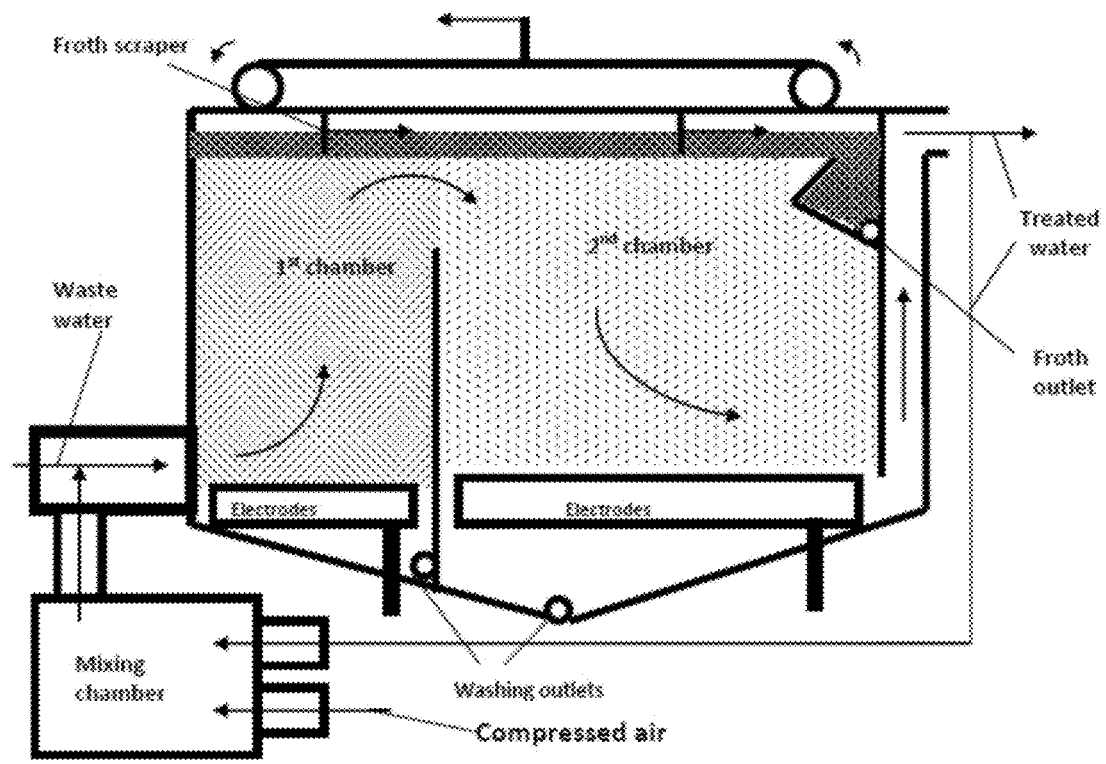
FIG. 4 illustrates the principle of the combiflotation of this invention, which is using micro flotation and electroflotation in chamber 1. Micro flotation creates a strong turbulent airlift to solid particles and electroflotation is used to assist the airlift process in an adjustable manner (current adjusted automatically according to the solid load). Because of the dual airlift, waste waters with largely changing solid loads can be treated. Chamber 2 is used as fine purification and as microbial removing and eliminating stage. A large volume for Chamber 2 is required because of the slowness of microbial decontamination process by electrode generated gases. If only fine purification is needed, the Chamber 2 can be smaller. Traditional air flotation and electroflotation can be also combined as in FIG. 4 (see also FIG. 1), but the purification may not be satisfactory.

FIG. 4 schematically illustrates the basic concept of the present invention, termed as combiflotation. The invention contains two preferably rectangular Chambers, 1st and 2nd. The chambers can be separated with a wall as depicted in FIG. 4 or the chambers can be separate tanks connected with a tube. In this case both tanks contain the electrodes as well as separate froth scrapers and froth removal systems. If the nature of the solids or the froth to be separated in tank 1 and 2 will differ very significantly, the fully separated tanks may be preferred. Such a situation can be if the solid load is heavy and the bulk material relatively coarse. Then this portion is taken off in the first stage and the fines are removed in the second stage. However, normally it is technically more feasible to have the tanks connected with a wall as in FIG. 4. It can be realized with a hole in the wall or partially, purified waste water is allowed to overflow to chamber 2 as depicted.

In a preferred construction of combiflotation as depicted in FIG. 4, once cleaned waste water out coming from the purification machine, is introduced to a standard pressurization or mixing chamber to be saturated with compressed air. The usual air pressures are of the order of 5-8 bars for the saturation. Standard commercially available micro flotation mixing chambers can be used. The higher pressure the higher dissolved air concentration and the higher amount of micro bubbles will be obtained. The air-saturated water is mixed at the inlet of waste water and introduced into chamber usually below of the electrode system which creates a covering electro generated bubble mat in Chamber 1. Electrically charged bubbles and air bubbles are lifted up by the buoyance forces. The milky stream is intentionally made turbulent and can be visually optimized. Usually optimization is achieved with regulating the flow from mixing chamber and electric current to electrodes. The flow-through time in Chamber 1 of waste water is short, from 30 s to 5 min. Different static or rotating mixing devices may be also used. The froth collecting onto the surface is continuously or timely removed with a froth scraper, exemplified by a moving belt scraper as in FIG. 4. It is advantageous to feed flocculating agents with the pressurized water or added before introduction of the air bubbles. Because air bubbles assist the smaller and slower moving electrogenerated bubbles, the current densities can be kept low. The air bubbles also rinse the electrodes from oxidizing and reducing gases. Therefore, the electrode corrosion is significantly diminished. Electricity and air may be also introduced into system with in a pulsed way the pulses being simultaneous or the pulses following each other. The Chamber 2 (stage 2) preferably produces only electro-generated bubbles. The waste water contains just after stage 1 (when entering to Chamber 2) only 1-3 grams of solid particles/liter but they are considerably finer and less flocculated than in stage 1. Therefore, conditions in Chamber 2 are arranged totally different than Chamber 1. The liquid flow is preferably laminar and the liquid flow is supported by a continuous mat of bubbles which prevents sedimentation. It is advantageous to fill Chamber 2 with a net of metal or plastic tubes or lamellas inserted over the electrodes. The lamellas introduce the purified liquid slowly from top to down in Chamber 2 and without turbulences while purified water is taken off from the system at the bottom as indicated in FIG. 4. Since the liquid flow in the tubes or lamellas is vertical down and the electro-generated bubbles move vertically up, the toxic gases tend to concentrate which has positive effect if the system is also used for disinfecting microbes. Small electrogenerated bubbles move up slowly, in general, and therefore inherently maintain the laminar flow. Because they concentrate, electric current can be kept low while the bubble density is relatively high. The sum effect is that the purification and/or disinfection efficiencies are very high. The required flow-through time in the second stage of purification depends on the needs of disinfection more than the purification degree from solids. It is normally advantageous to have 3 times longer flow-through time in Chamber 1 than in Chamber 2.

If the disinfection property of the electro-generated gases is not needed, it is convenient to introduce air-saturated water also under the electrodes of Chamber 2 from the Mixing chamber (shown in FIG. 4). It is preferable to adjust the flow so small that the laminar flow conditions are still maintained.

The dissolvable electrodes preferably made of stainless steel or titanium, are arranged in such a way that the bubble formation is practically even over the whole bottom surfaces of Chambers 1 and 2 but the electrical bubble concentrations are not necessarily the same in Chambers 1 and 2. The first and the second chambers operate independently from each other so that bubble densities are adjustable independently in the chambers. The air bubbles and electro-generated bubbles are provided in volume ratio from 0:51 to 5:1, respectively, in the first chamber.

As was described, the combiflotation system of the present invention allows construction of efficient purification machinery in a compact form. Preferable construction involves air-saturated water for generation of micro bubbles and electroflotation system. Both systems are known in the prior art but their optimal combination has shown according to the present invention completely new and surprising features. The combiflotation system allows purification of waste waters containing up to 100-200 grams of solids and having high viscosity. Traditional air-flotation is not usually advantageous, for its low effectiveness due to the bubbles' small surface area/volume, however, when the viscosity of the liquid is high, traditional flotation may be useful either with electroflotation or with combination all the described techniques. Traditional flotation may also be used to assist in forming strong airlift and turbulence when the viscosity of waste water is very high.

A special advantage of combiflotation is in its flexibility as a universal purification machine. The system can be easily regulated with electrical current and air-pressurized liquid flow rates to be mixed into the waste water or for applied air pressure. Contributions from air and electroflotation are beneficial subject of adjustment. Therefore, almost any kind of waste water can be purified with the same basic equipment. It is also possible to use the same equipment for separating valuable organic or inorganic mineral particles from a water slurry containing water, valuable minerals and dirt or other unwanted material that is to be separated from the water slurry by combiflotation. The system can also be used for disinfection of microbes which may be needed for municipal waste waters. This disinfection feature can be increased or decreased with adjusting electrical/air flotation ratios. The waste water flow rate is normally changing along with day time. The flow rate can be connected to the other adjustment systems so that energy consumption remains optimal when the highest purification capacity is not needed. Even temperature of incoming waste water can be considered in the adjustments. Air saturation is dependent on the temperature and if an economical cooling system is available, it is advantageous to have cold saturated water to be introduced into waste water when micro flotation is exploited. When the temperature is raised in injection into waste water, extremely small air bubbles (down to 1-10 μm) can be acquired. The whole system can be controlled with a few sensors and with a relatively simple computer program. The purification machine can function, therefore, independently even in very complex and fast changing conditions. A distinctly different feature with the scheme by Clewer (see Background of the Invention) and the present invention (illustrated in FIG. 4) is that the present invention is using air to create turbulent conditions for flocks to lift it up available to the scraper. The flock formation is assisted by small electro-generated bubbles from the whole area of the tank bottom. Because of that, practically all solids are collected in froth and are not allowed to sediment. The first stage (Chamber 1) has the function of effectively reducing the suspended solids and primarily not for disinfection purposes. The present invention also preferentially contains two stages, one for crude purification (Chamber 1) and the second (Chamber 2) for final or fine purification. Because of that construction the whole system contains two independent sets of electrodes not one as described in the scheme by Clewer.

Because there are very different waste waters to be purified, it is possible to modify the basic construction depicted in FIG. 4 in large degrees as described before. In some cases, it may be possible to use only the advantageous features of Chamber 1. The requirements for the purification degree may not be high or the properties of the waste water are such that air-lift assisted electroflotation is needed when no other flotation system is working properly; for example, when a moderate purification is needed in a circulated waste water purification system in industrial processes. Typical applications can be found in food and feed industry, paper industry, oil industry, biotechnological processes, and so on. Dimensions of the combiflotation machine can be different from few liters to tens of thousands of liters. Basically, in up-scaling all the dimensions can be increased equally for equal waste water in small and big scale. The relative dimensions may need to be different for different waste waters. Even the construction of FIG. 4 can be considered as rectangular, it can be also of 30 different form, for example cylindrical. The height vs. length and depth can be also changed in large limits for all shapes of the machine. Up-scaling of the machine is exceptionally easy by increasing the depth dimension. Up-scaling of the rectangular machines is the most straightforward.

In the following the special features of combiflotation is further illustrated with non-limiting examples.

Example 1: Combiflotation Machine and its Test Conditions

The electroflotation and combiflotation experiments were performed at 20° C. with a device essentially similar to the one described in FIG. 4. The pilot machine was constructed from stainless steel and equipped with valves, inlets and outlets and froth scraper essentially as depicted in FIG. 4. The length of the system was 2 m, height 1.6 m and the depth 0.3 m. Length of the Chamber I was 0.5 m and Chamber 2 was 1.5 m. Waste water was introduced to Chamber 1 via an opening of 0.3 m on the left side bottom corner of Chamber 1. Pressurized water was introduced in ¼-1/7 of the volume of waste water into Chamber 1 as in FIG. 4. Total flow rates were varied from 1200-2250 liter/h. Total currents at the stainless steel electrodes were tested between 50 and 200 A. Electroflotation experiments were done by adding the same amount of non-pressurized water as the pressurized water with combiflotation. The air pressure of 5-10 bar was used for acquiring the pressurized water.

Example 2: Comparison of Combiflotation and Electroflotation in Food Industry Wastes About 50/50 mixture of waste water from fish and potato industries was compared with the device of Example 1. Several experiments were done in different conditions. Typical flow through rate was 2000 l/h. Total current for electroflotation was 100 A with suspended solids 4900 mg/l (current was usually divided 50% in Chamber 1 and 50% Chamber 2). At the outlet solids amount was 930 mg/l (reduction 81%). The same experiment with assistance of micro flotation was done with using 60 A current (30 A in both chambers). The reduction was increased to 84%.

Because of the much smaller currents, the electrode life times could be dramatically increased. In an experiment with the load of 7300 mg/l of suspended solids and flow rate of 1200 l/h, the reduction in electroflotation decreased to 350 mg/l while with combiflotation it was 270 mg/l. The amount of phosphorus and nitrogen (total amount 67 and 470 mg/l) was decreased to 23 and 270 mg/l, respectively. There was again related improving effect with combiflotation. Same currents were applied as in the previous experiments. When electroflotation was combined with traditional air flotation, the purification results were clearly worse than when electroflotation and micro flotation was combined.

Example 3: Comparison of Combiflotation and Electroflotation Applied to Margarine Industry Wastes Sixteen experiments with flow rates from 750 l/h to 3150 l/h were done. The amount of suspended solids in input was from 22 mg/l to 880 mg/l and fats from 235 mg/l to 2840 mg/l. The reduction of suspended solids with electroflotation alone was from 9% to 95% (average 75%) while reduction of fats was from 80% to 98% (average 91%). The reduction of both solids and fats was 2-5% better with combiflotation than with electroflotation but, noteworthy again, the current density with combiflotation was only 60%.

What is claimed is:

1. A construction of continuously operating waste water purification device comprising a mixing chamber, a flotation tank having a first and a second chamber, and a froth scraper, wherein
    the mixing chamber is configured to contain air saturated water and having an outlet for the air saturated water to mix with wastewater to be purified;
    the first chamber having non-dissolvable electrodes at its bottom for producing flotation gas by electrolysis and forming electrogenerated gas bubbles, and an inlet to allow the waste water mixed with the air saturated water to enter the first chamber below the non-dissolvable electrodes to produce air bubbles simultaneously with formation of the electrogenerated pas bubbles;
    water flow in the first chamber being arranged to be from bottom to top and the wastewater having access to the second chamber;
    the second chamber having non dissolvable electrodes at its bottom independent from the electrodes of the first flotation chamber, for producing flotation gas by electrolysis and forming electrogenerated gas bubbles, and the direction of water flow in the second chamber being arranged from top to bottom, and the chamber having an outlet for purified water at its bottom; and
    the froth scraper arranged to collect froth formed in the first and the second chambers.

2. The construction according to claim 1, wherein purified water from the outlet at the bottom of the second chamber is recycled and introduced via the mixing chamber back to the first chamber.

3. The construction according to claim 1, wherein non-dissolvable electrodes are arranged in such a way that bubble formation is even over combined bottom surfaces of the first and the second chamber and independently controllable in each chamber via the independent electrodes.

4. The construction of claim 3, wherein the non-dissolvable electrodes are made of stainless steel or titanium.

5. The construction according to claim 1, wherein the first chamber has turbulent flow generated by both air and electrolysis gases by adjusting air pressure and electrical current, respectively.

6. The construction according to claim 1, wherein the second chamber contains fine purification by electroflotation and lamellas to minimize the turbulent flow.

7. The construction according to claim 1, wherein a disinfection of microbes is improved in the second chamber by decreasing proportion of air-bubbles into the second chamber.

8. The construction according to claim 1, wherein the first chamber is configured such that air bubbles and electro-generated pas bubbles are provided in volume ratio from 0.5:1 to 5:1, respectively, in the first chamber.

9. The construction according to claim 1, wherein flow through time in the first chamber is configured to be three times longer than in the second chamber.

10. The construction according to claim 1, wherein the water flow in the first chamber is arranged to be turbulent and in the second chamber the water flow is arranged to be laminar.

11. A method to continuously purify wastewater, the method comprising:
    providing the construction of claim 1,
    providing compressed air and water into the mixing chamber to produce air saturated water;
    mixing the air saturated water and wastewater to form wastewater with air bubbles and allowing the wastewater with air bubbles to enter the first chamber;
    simultaneously electrolytically generating gas bubbles in the first chamber by electric current in the electrode;
    allowing the wastewater with the air bubbles and the electrolytically generated gas bubbles to flow from bottom to top of the chamber and flow over to the second chamber;
    allow the wastewater in the second chamber flow from top to bottom and simultaneously electrolytically generate gas bubbles in the second chamber by electric current in the electrode;
    leading purified water back to the mixer to be mixed with compressed air, and further to be mixed with wastewater and recycled back to the first chamber.

* * * * *